(12) United States Patent
Naito et al.

(10) Patent No.: US 6,201,338 B1
(45) Date of Patent: Mar. 13, 2001

(54) ULTRASONIC MOTOR

(75) Inventors: Shinichi Naito; Hiroyuki Furukoshi, both of Toyohashi (JP)

(73) Assignee: ASMO Co., Ltd. (JP)

( * ) Notice: Subject to any disclaimer, the term of this patent is extended or adjusted under 35 U.S.C. 154(b) by 0 days.

(21) Appl. No.: 09/215,606

(22) Filed: Dec. 17, 1998

(30) Foreign Application Priority Data

Dec. 24, 1997 (JP) .................................................. 9-355694

(51) Int. Cl.⁷ .................................................. H01L 41/04
(52) U.S. Cl. ................. 310/323.05; 310/323.04
(58) Field of Search ........................... 310/323.04, 323.05

(56) References Cited

U.S. PATENT DOCUMENTS

| | | | |
|---|---|---|---|
| 3,693,035 | * | 9/1972 | Ostwald .................................. 310/51 |
| 5,402,030 | * | 3/1995 | Mukohjima ........................... 310/323 |

FOREIGN PATENT DOCUMENTS

| | | | |
|---|---|---|---|
| 6-133567 | * | 5/1994 | (JP) . |
| 5-31688 | | 12/1994 | (JP) . |
| 6-88198 | | 12/1999 | (JP) . |

* cited by examiner

Primary Examiner—Nestor Ramirez
Assistant Examiner—Peter Medley
(74) Attorney, Agent, or Firm—Trask Britt

(57) ABSTRACT

An ultrasonic motor includes a rotor and a rotor accommodated in a housing. The stator includes a piezoelectric element and the housing is secured to a base by screws. The rotor contacts the stator. The piezoelectric element vibrates the stator to rotate the rotor. An insulation plate is located between the stator and the base. An insulation washer is located between the stator and each screw. A rotary shaft is rotatably supported by the housing. The rotary shaft is coupled to the rotor with an insulation collar in between. Therefore, the stator and the rotor are electrically insulated from the housing and the rotary shaft. This arrangement reduces electromagnetic noise, which interferes with other electric devices, such as radios.

14 Claims, 6 Drawing Sheets

ULTRASONIC MOTOR

BACKGROUND OF THE INVENTION

The present invention relates to an ultrasonic motor employed in vehicles. More particularly, the present invention pertains to an ultrasonic motor that lowers electromagnetic noise.

FIG. 8 illustrates a typical ultrasonic motor 50. The motor 50 has a metal base 54 and a metal cover 58. The base 54 and the cover 58 form a motor housing. The base 54 is secured, for example, to a vehicle body frame. The motor housing houses a stator 52 made of iron and a rotor 53 made of aluminum. The rotor 53 is pressed against the stator 52. A rotary shaft 55 is supported by the base 54. A ball bearing 56 is located between the shaft 55 and the base 54 to allow the shaft 55 to rotate relative to the base 54. The rotor 53 is secured to the shaft 55 to integrally rotate with the shaft 55.

The stator 52 includes a disk-shaped diaphragm 45, a stationary plate 46 fixed to the inner bottom surface of the diaphragm 45 and a ring-shaped piezoelectric element 51 secured to the outer bottom surface of the diaphragm 45. The stationary plate 46 is secured to the base 54 by screws. The diaphragm 45 has radially extending teeth 45a along its the circumference. The distal end 45b of each tooth 45a contacts the bottom surface of the rotor 53.

The piezoelectric element 51 is polarized and has an A-phase region 51a, a B-phase region 51b and a vibration detecting region 51c as shown in FIG. 9. Each of the regions 51a, 51b, 51c is connected to a lead wire 57a, 57b, 57c by an electrode, respectively. Further, the regions 51a–51c are connected to a common grounding lead wire 57d. As illustrated in FIG. 8, the lead wires 57a–57d are connected to a connector 59 located outside of the cover 58.

As illustrated in FIG. 9, the connector 59 is connected to an electronic control unit (ECU) 60 by a shielded line 61. The ECU 60 is located far from the ultrasonic motor 50. The shielded line 61 includes an A-phase power supply wire 61a, a B-phase power supply wire 61b, a feedback signal wire 61c and a grounding wire 61d. The ECU 60 applies high-frequency voltage to the A-phase region 51a through the A-phase power supply wire 61a, the connector 59 and the lead wire 57a. The ECU 60 also applies high-frequency voltage to the B-phase region 51b through the B-phase power supply wire 61b, the connector 59 and the lead wire 57b. There is a ninety-degree phase difference between the voltage sent to the A-phase region 51a and the voltage sent to the B-phase region 51b. The high frequency voltages vibrate the A-phase region 51a and the B-phase region 51b. The vibration vibrates the distal ends 45b of the teeth 45a with respect to the stator 52. The vibration of the distal ends 45b generates a progressive wave. The progressive wave rotates the rotor 53, which is pressed against the distal ends 45b. The rotation of the rotor 53 is transmitted to the rotary shaft 55.

The feedback signal wire 61c is connected to the vibration detecting region 51c by the connector 59 and the lead wire 57c. The region 51c generates voltage in accordance with vibration of the A-phase region and the B-phase region 51b and outputs the generated voltage to the ECU 60. The ECU 60 feedback controls the high frequency voltage applied to the A-phase region 51a and the B-phase region 51b based on this voltage. The grounding wire 61d is connected to the grounding lead wire 57b by the connector 59. The regions 51a–51c of the piezoelectric element 51 are grounded to the vehicle body frame through the ECU 60.

As illustrated in FIG. 8, the stationary plate 46 of the stator 52 is fastened to the base 54. The rotor 53 is pressed against the diaphragm 45 of the stator 52 and is coupled to the rotary shaft 55. The shaft 55 is supported by the bearing 56. That is, the stator 52 is directly and electrically connected the base 54 and is indirectly and electrically connected to the base 54 via the rotor 53, the rotary shaft 55 and the bearing 56.

Therefore, the regions 51a, 51b, 51c of the piezoelectric element 51 are grounded not only through the ECU 60 but also through the base 54. In other words, the ultrasonic motor 50 is directly grounded to the vehicle body frame. The impedance of the grounding wire 61d between the ultrasonic motor 50 and the ECU 60 is higher than the impedance of the body frame. Therefore, when the ECU 60 applies high frequency voltage to the motor 50, grounded current does not flow through the grounding wire 61d but flows to the ECU 60 through the vehicle body frame. The motor 50, the shielded line 61d and the body frame form a closed loop circuit. The closed loop circuit functions as a loop antenna, which generates electromagnetic noise. The farther from the motor 50 the ECU 60 is located, the larger the area surrounded by the closed loop circuit becomes. A larger area surrounded by the closed loop circuit increases the electromagnetic noise. The electromagnetic noise generates radio noise, which interferes with the sound of the car radio. The electromagnetic noise also adversely affects other communications devices.

SUMMARY OF THE INVENTION

Accordingly, it is an objective of the present invention to provide an ultrasonic motor that reduces electromagnetic noise.

To achieve the foregoing and other objectives and in accordance with the purpose of the present invention, an ultrasonic motor is provided. The motor includes a stator, a movable body and a housing. The stator has a piezoelectric element. The movable body contacts the stator. The piezoelectric element vibrates the stator to move the movable body. The housing supports the stator. The stator is electrically insulated from the housing.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 10 is a schematic drawing of a vehicle having a motor of the invention associated therewith.

DETAILED DESCRIPTION OF THE PREFERRED EMBODIMENTS

An ultrasonic motor 1 according to a first embodiment of the present invention will now be described with reference to FIGS. 1 to 4. The motor 1 is used in a telescopically adjustable steering column.

Figure 1:
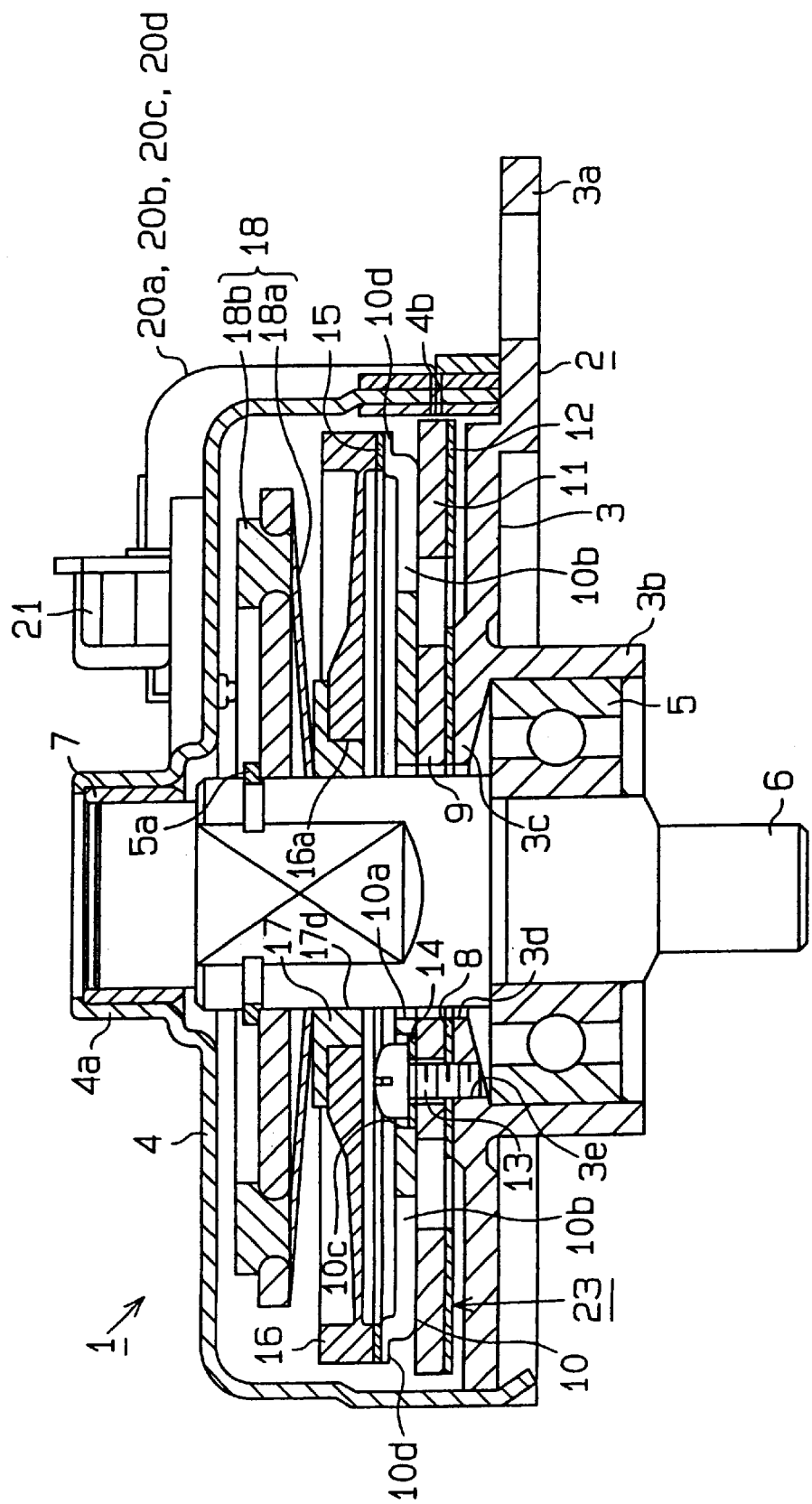
FIG. 1 is a cross-sectional view illustrating an ultrasonic motor according to a first embodiment of the present invention.

As illustrated in FIG. 1, a housing 2 of the motor 1 includes a base 3 and a cover 4. The base 3 is metal and includes a support 3a, a boss 3b, a rim 3c and a hole 3d. The support 3a is fastened to a bracket of a steering device, which is a part of a vehicle body frame. The boss 3b supports a ball bearing 5. The rim 3c extends radially inward from the upper end of the boss 3b and defines the hole 3d. The hole 3d receives a rotary shaft 6. The diameter of the hole 3d is larger than that of the rotary shaft 6. The rim 3c has threaded holes 3e (see FIG. 2).

The cover 4 is formed by pressing a metal plate and has a boss 4a for supporting a bearing 7. A through hole 4b is formed in the side wall of the cover 4. The rotary shaft 6 is supported by the bearings 5, 7 to be rotatable relative to the housing 2.

Figure 2:
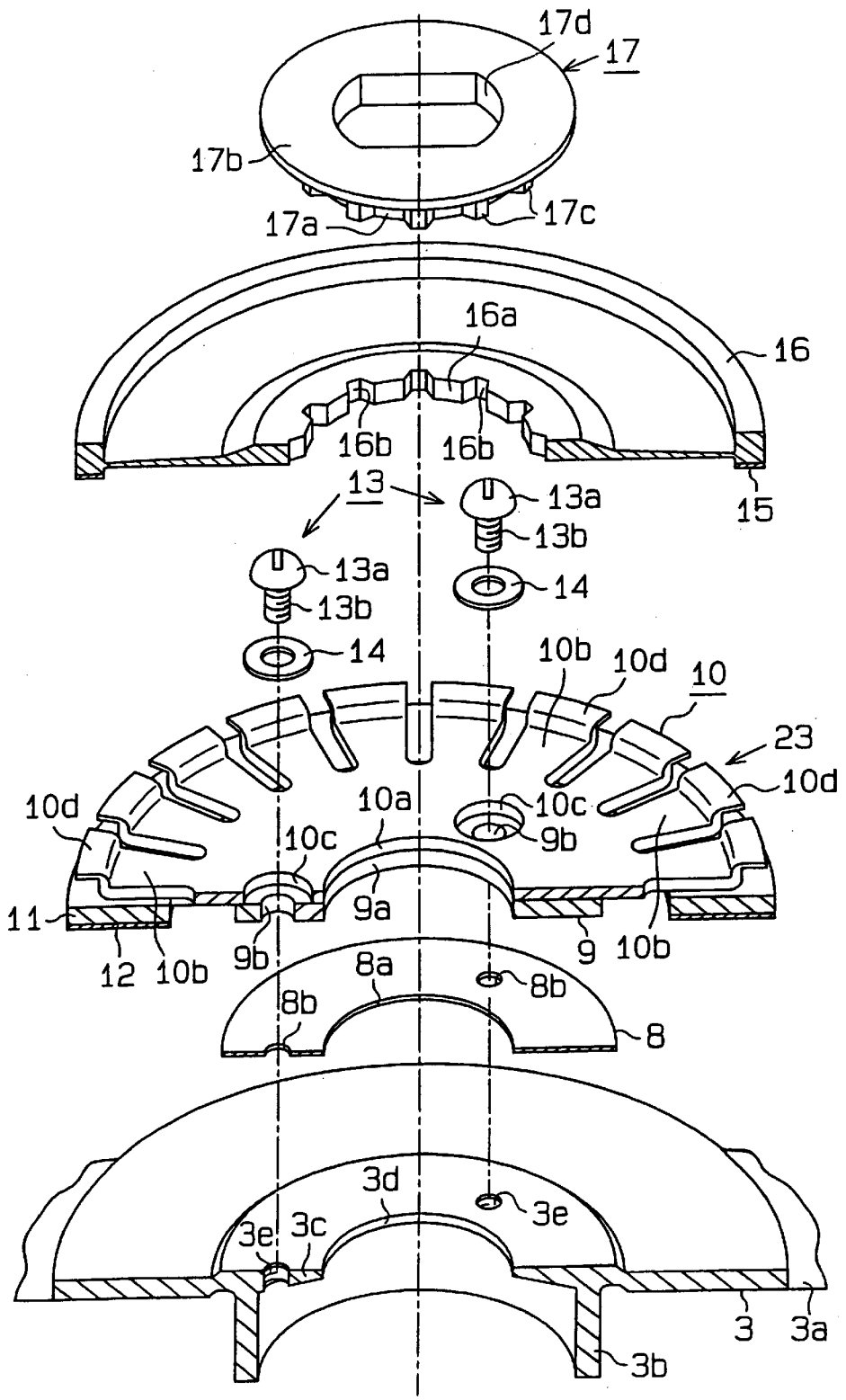
FIG. 2 is an exploded perspective view illustrating the ultrasonic motor of FIG. 1.

As illustrated in FIGS. 1 and 2, a ring-shaped insulation plate 8 is located on the top surface of the rim 3c of the base 3. The plate 8 has a hole 8a in its center to receive the rotary shaft 6. The diameter of the hole 8a is equal to that of the hole 3d of the base 3. The plate 8 also has holes 8b, each of which corresponds to one of the threaded holes 3e of the rim 3c. A stator 23 is located on the top of the plate 8.

The stator 23 includes a diaphragm 10, a metal ring plate 9 brazed to the radially inner portion of the diaphragm's bottom surface, a base ring 11 brazed to the radially outer portion of the diaphragm's bottom surface and a ring shaped piezoelectric element 12 adhered to the bottom of the base ring 11. The diaphragm 10 is made of rolled steel such as cold rolled steel. The diaphragm 10 has teeth 10b extending radially outward. The distal end of each tooth 10b is formed like a crank and includes a contact 10d. The ring plate 9 is located on the insulation plate 8. The diameter of the ring plate 9 is smaller than the diameter of the insulation plate 8.

The ring plate 9 and the diaphragm 10 each have a hole 9a, 10a to receive the rotary shaft 6. The diameter of the holes 9a, 10a is equal to the diameter of the holes 3d, 8a. Thus, the diameter of the holes 9a, 10a is larger than the diameter of the rotary shaft 6. The ring plate 9 and the diaphragm 10 each have holes 9b, 10c, which correspond to one of the threaded holes 3e formed in the rim 3c.

Figure 3:
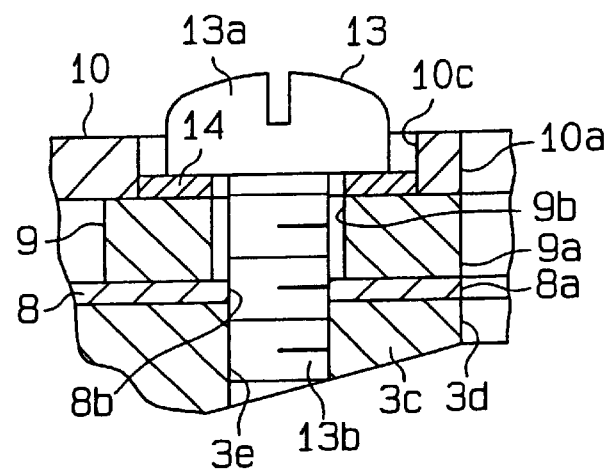
FIG. 3 is an enlarged partial cross-sectional view showing the ultrasonic motor of FIG. 1.

A screw 13 having an insulation washer 14 is inserted into each set of the holes 10c, 9b, 8b of the diaphragm 10, the ring plate 9 and the insulation plate 8. The screw 13 is then screwed to the corresponding threaded hole 3e of the rim 3c. The screws 13 fasten the stator 23 to the base 3 with the insulation plate 8 in between. As illustrated in FIG. 3, the diameter of each washer 14 is equal to or slightly smaller than the diameter of the hole 10c formed in the diaphragm 10. The diameter of the hole 10c is larger than the diameter of the screw head 13a. The diameter of the hole 9b is larger than the diameter of the threaded portion 13b of the screw 13. Therefore, when the stator 23 is fastened to the base 3 by the screws 13, the ring plate 9 and the diaphragm 10 do not contact the screws 13. In other words, the stator 23 is electrically insulated from the base 3.

As illustrated in FIGS. 1 and 2, a movable body, or rotor 16, is located on the stator 23. The rotor 16 is made of stainless steel or aluminum alloy. A lining member 15 is secured to the lower circumferential surface of the rotor 16. The contacts 10d of the diaphragm 10 contact the lining member 15.

The rotor 16 has a hole 16a in its center. An insulation collar 17 is fitted in the hole 16a. Recesses 16b are formed in the wall of the hole 16a. The recesses 16a are spaced at equal angular intervals. The insulation collar 17 includes a hub 17a and a flange 17b, which is formed on one end of the hub 17a. The hub 17a has projections 17c formed on its circumferential surface. Each projection 17c corresponds to and is engaged with one of the recesses 16a on the rotor 16. The engagement secures the collar 17 to the rotor 16. The collar 17 also has a hole 17d, which has a pair of parallel flat walls. The rotary shaft 6 is formed to correspond to the shape of the hole 17d and is fitted in the hole 17d. The collar 17 secures the rotor 16 to the rotary shaft 6 such that the shaft 6 rotates integrally with the rotor 16.

As illustrated in FIG. 1, the lower surface of the flange 17b contacts the upper surface of the rotor 16, and the upper surface of the flange 17b is pressed by a pressing member 18. The pressing member 18 includes a disk spring 18a and a plate 18b. The plate 18b is engaged with a snap ring 5a fitted to the rotary shaft 6. The snap ring 5a prevents the plate 18b from moving upward. Thus, the pressing member 18 presses the rotor 16 against the stator 23. The pressing member 18 rotates integrally with the rotor 16 and the shaft 6. The collar 17 electrically insulates the rotor 16 from the pressing member 18 and the shaft 6.

The base 3 is secured to the bracket of a vehicle steering device (not shown). In other words, the base 3 fixes the ultrasonic motor 1 to the body frame. The motor 1 is controlled by an electronic control unit (ECU) 19, which is independent from the motor 1 and is fixed to the vehicle body frame.

Figure 4:
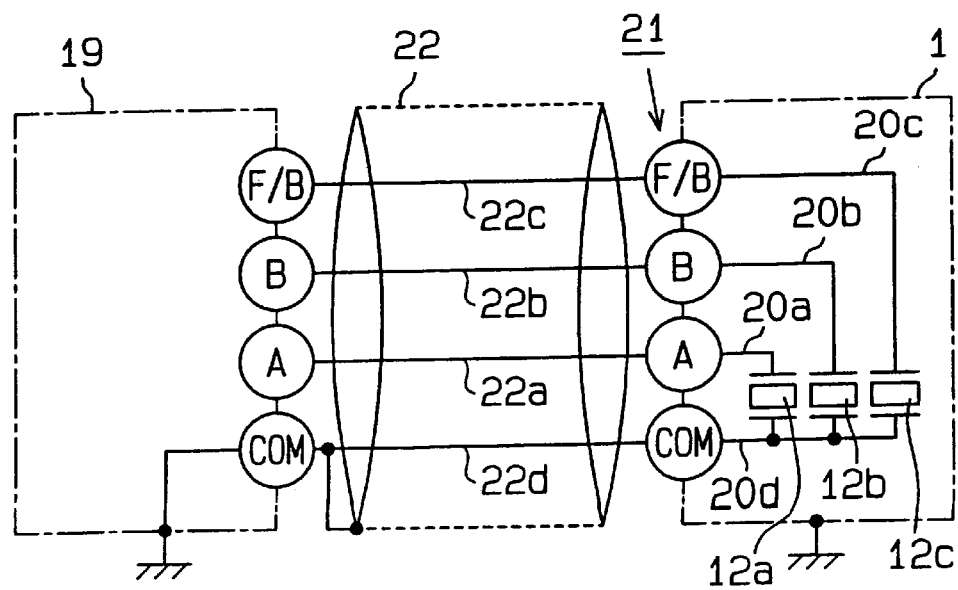
FIG. 4 is a circuit diagram illustrating the ultrasonic motor and the ECU illustrated in FIG. 1.

As shown in FIG. 4, the piezoelectric element 12 is polarized and has an A-phase region 12a, a B-phase region 12b and a vibration detecting region 12c. Each of the regions 12a, 12b, 12c is connected to a lead wire 20a, 20b, 20c by an electrode. Further, the regions 12a–12c are connected to a common grounding lead wire 20d. The lead wires 20a–20d are connected to a connector 21 located outside the cover 4 through the hole 4b formed in the cover 4.

As illustrated in FIG. 4, the connector 21 is connected to the ECU 19 by a shielded line 22. The shielded line 22 includes an A-phase power supply wire 22a, a B-phase power supply wire 22b, a feedback signal wire 22c and a grounding wire 22d. The ECU 19 applies high-frequency voltage to the A-phase region 12a through the A-phase power supply wire 22a, the connector 21 and the lead wire 20a. The ECU 19 also applies high-frequency voltage to the B-phase region 12b through the B-phase power supply wire 22b, the connector 21 and the lead wire 20b. There is a ninety-degree phase difference between the voltage sent to the A-phase region 12a and the voltage sent to the B-phase region 12b. The high frequency voltages vibrate the A-phase region 12a and the B-phase region 12b. The vibration of the regions 12a, 12b vibrates the contact 10d of each tooth 10b of the diaphragm 10 in the stator 23. The vibration of the distal ends 10d generates a progressive wave. The progressive wave rotates the rotor 16, which is pressed against the distal ends 10d. The rotation is then transmitted to the rotary shaft 6.

Figure 5:
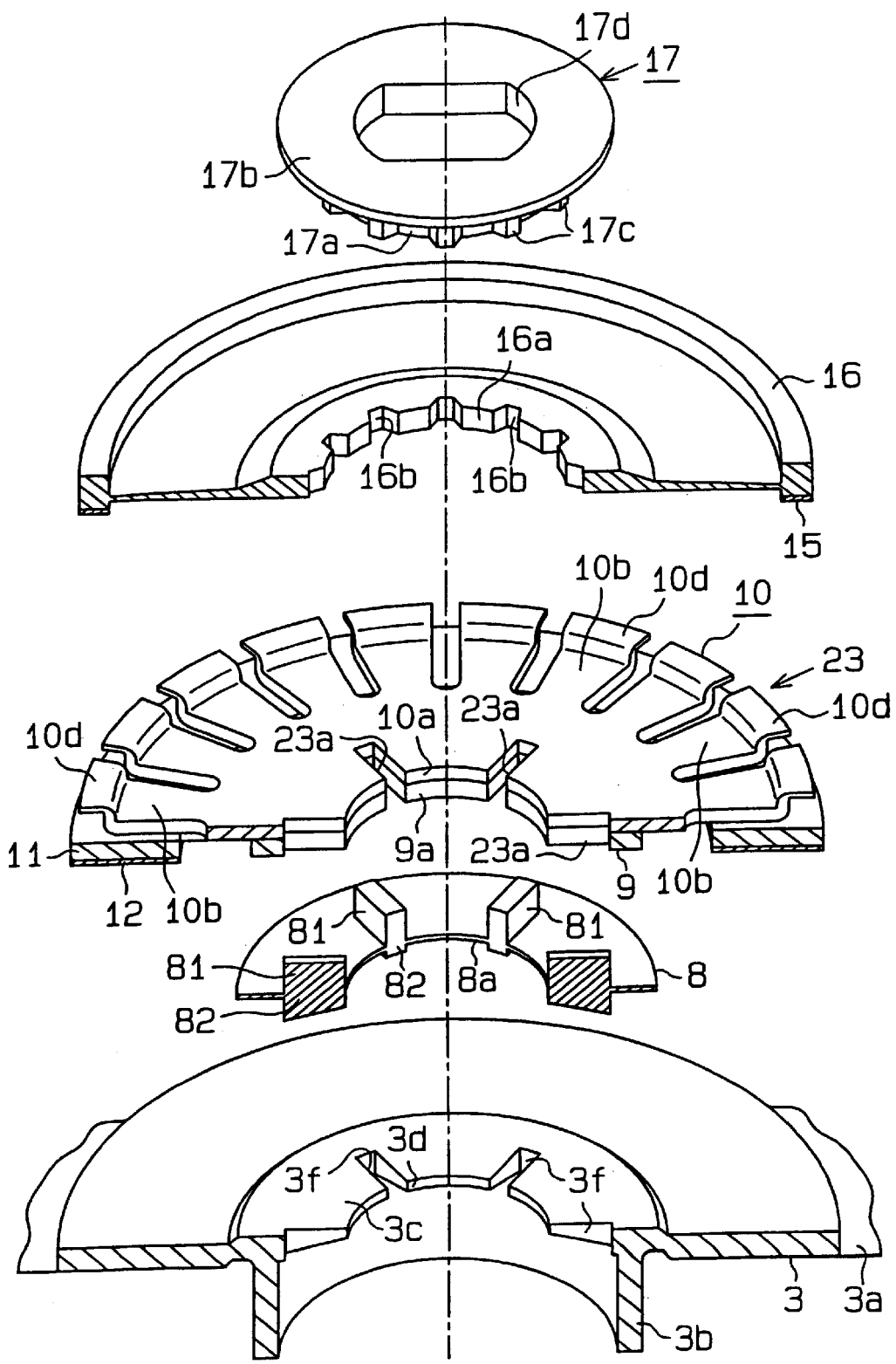
FIG. 5 is an exploded perspective view illustrating an ultrasonic motor according to a second embodiment.
Figure 6:
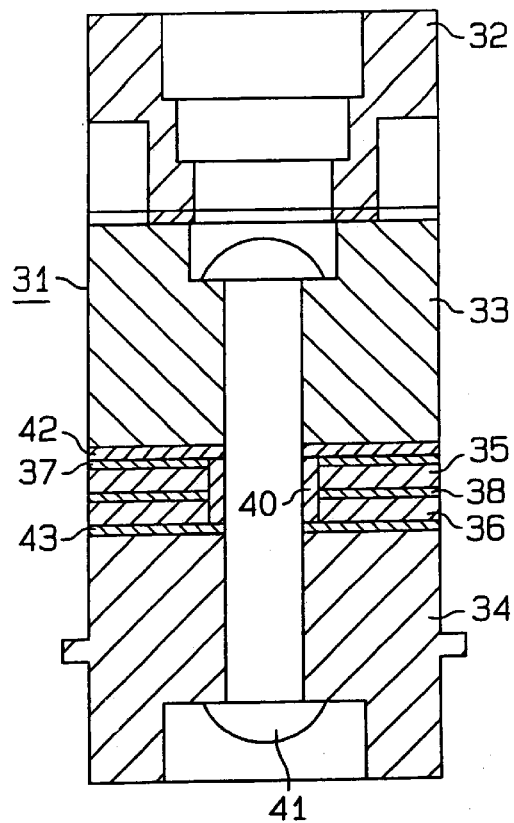
FIG. 6 is an enlarged partial cross-sectional view illustrating an ultrasonic motor according to a third embodiment of the present invention.
Figure 7:
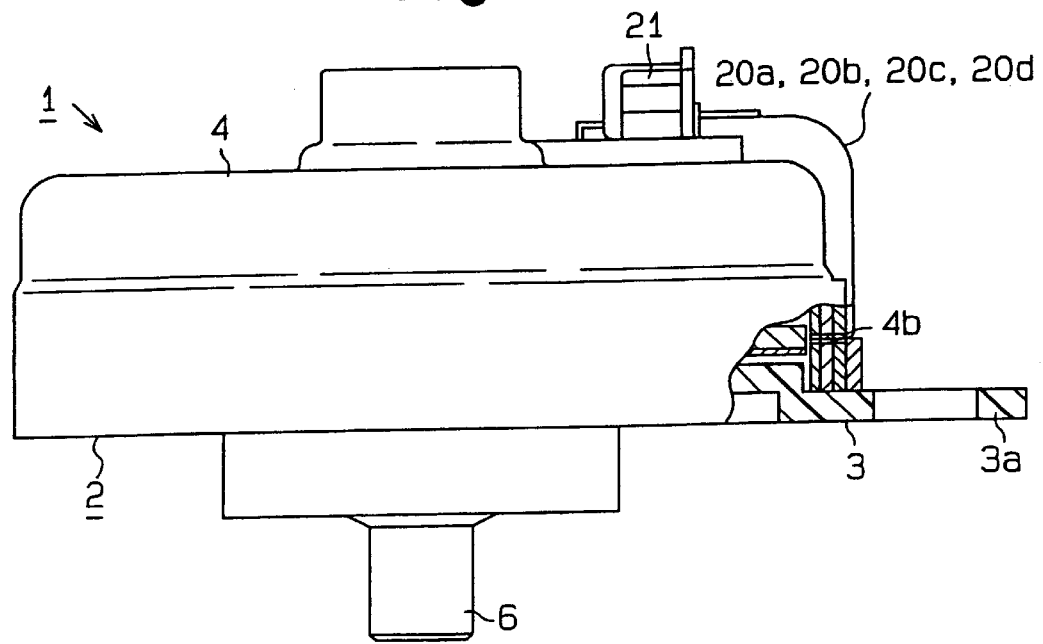
FIG. 7 is a front view, with a part cut away, illustrating an ultrasonic motor according another embodiment of the present invention.
Figure 8:
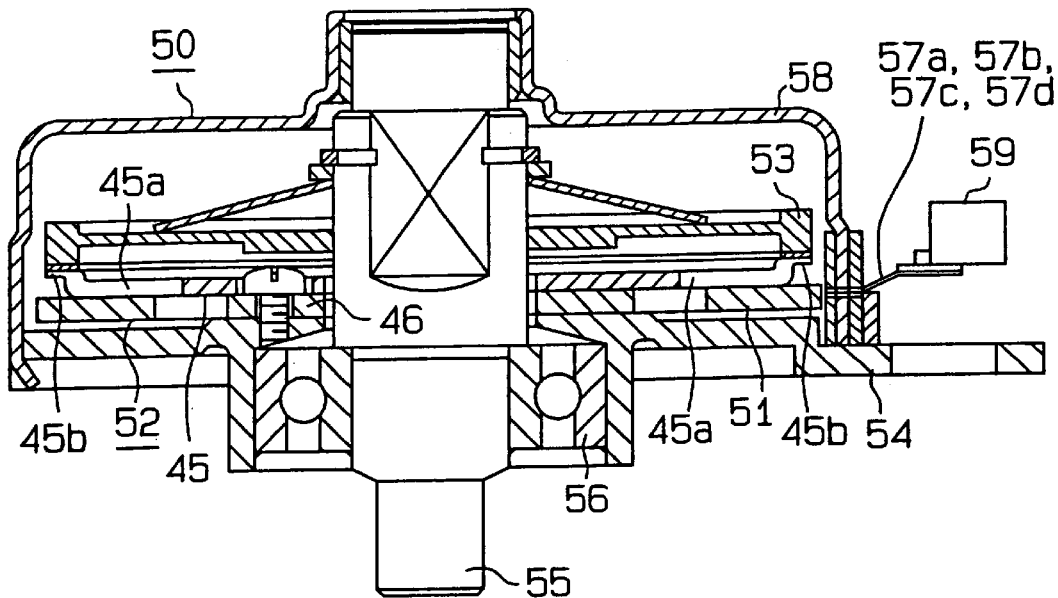
FIG. 8 is a cross-sectional view illustrating a prior art ultrasonic motor.
Figure 9:
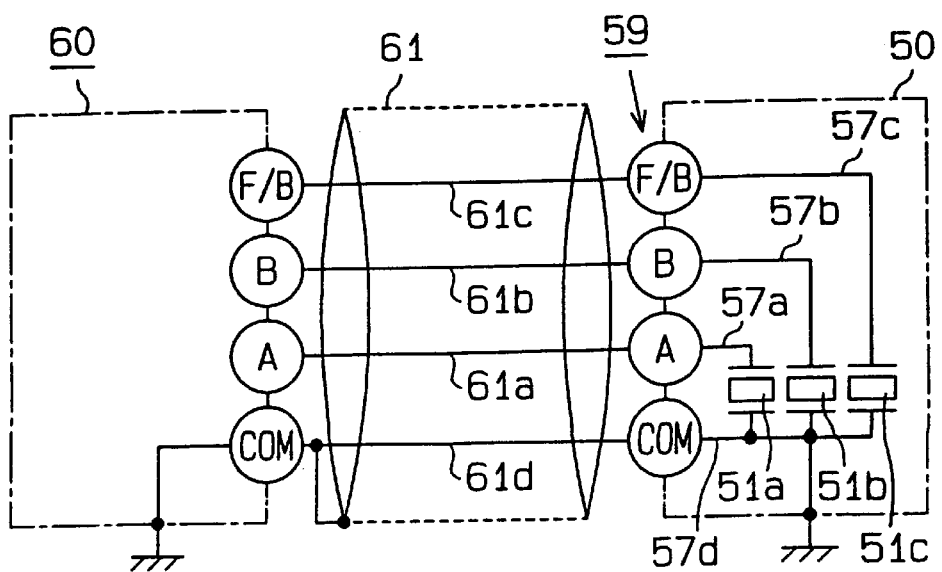
FIG. 9 is a circuit diagram illustrating the ultrasonic motor and the ECU illustrated in FIG. 8.

The ultrasonic motor 1 has the following advantages. The insulation plate 8 is located between the stator 23 and the base 3 of the housing 2. Further, the insulation washers 14 insulate the screws 13, which fasten the stator 23 to the base 3. Thus, the stator 23 and the rotor 16 are electrically insulated from the housing and the rotary shaft 6. When the ECU 19 applies high-frequency voltage to the stator 23, a grounding current does not flow to the vehicle body frame through the housing 2. Instead, a grounding current flows to the ECU 19 through the grounding wire 22d. Therefore, the ECU 19, the motor 1 and the body frame do not form a closed loop circuit. In other words, a loop antenna, which generates electromagnetic noise, is not formed. Thus, electromagnetic noise is not generated. The direction of the current flowing in the grounding wire 22d is opposite to the direction of the current flowing in the power supply wires 22a, 22b. Thus, electromagnetic noise generated by the current in the grounding wire 22d and electromagnetic noise generated by the current in the supply wires 22a, 22b cancel each other. This lowers the electromagnetic noise generated by the shielded line 22.It should be apparent to those skilled in the art that the present invention may be embodied in many other specific forms without departing from the spirit or scope of the invention. Particularly, it should be understood that the invention may be embodied in the following forms. The stator 23 may be fixed to the base 3 by means other than the screws 13. FIG. 5 shows an example. In FIG. 5, the metal ring plate 9 and the diaphragm 10 have radially extending recesses 23a, the number of which is six in the embodiment of FIG. 5. The recesses 23 are formed adjacent to the holes 9a and 10a. Also, the rim 3c of the base 3 includes six radially extending recesses 3f, which are formed adjacent to the hole 3d. The insulation plate 8, which is located between the base 3 and the stator 10, is made of high-strength rigid resin. The plate 8 has first protrusions 81 that are engaged with the recesses 23a and second protrusions 82 that are engaged with the recesses 3f. The protrusions 81, 82 are integrally formed with the insulation plate 8. The stator 23 and the insulation plate 8 are fixed to each other by mating the first protrusions 81 with the recesses 23a. The protrusions 81 and the recesses 23a prevent the stator 23 and the plate 8 from moving relative to each other in the radial and angular directions. The base 3 and the insulation plate 8 are fixed to each other by mating the second protrusions 82 with the recesses 3f. The protrusions 82 and the recesses 3f prevent the base 3 and the plate 8 from moving relative to each other in the radial and angular directions. Consequently, the stator 23 is prevented from moving radially relative to the base 3. The stator 23 and the insulation plate 8 are assembled to the base 3 by simply mating the protrusions 81, 82 with the recesses 23a, 3f. The assembly of the motor 1 is facilitated, accordingly. The stator 23 and the insulation plate 8 are not locked to the base 3 in the axial direction. However, the pressing member 18 shown in FIG. 1 constantly presses the stator 23 against the base 3 thereby preventing axial movement of the stator 23. The construction of FIG. 5 therefore requires no fasteners such as screws and thus simplifies the motor 1. The first protrusions 81 and the second protrusions 82 are axially aligned with each other. Thus, the recesses 23a receiving the first protrusions 81 are axially aligned with the recesses 3f receiving the second protrusions 82. Therefore, axial load of the pressing member 18 acting on the stator 23 is received by the base 3 through the insulation plate 8. The axial load is not received by the insulation plate 8. This extends the life of the plate 8.If the stator 23 is fixed to the base 3 by screws, the axial load of the pressing member 18 is concentrated at the screws. The concentrated load may deform the plate 8 and the stator 23. However, since the embodiment of FIG. 5 uses no screws, the load of the pressing member 18 acts uniformly on the entire plate 8 and does not deform the plate 8 and the stator 23. This results in stable contact between the rotor 16 and the stator 23. The torque of the motor 1 is stabilized, accordingly.In FIG. 5, the recesses 23a and 3f communicate with the holes 9a and 3d, and are formed through the entire thickness of the stator 23 and the base 3, respectively. However, the recesses 23a and 3f may be replaced with openings having any shape as long as they receive the projections 81, 82 on the insulation plate 8. For example, the recesses 23a and 3f may be replaced with holes that are independent from the holes 9a and 3d. Alternatively, the projections 81, 82 may be shortened in the axial direction and received by recesses formed in the facing surfaces of the stator 23 and the base 3.The motor illustrated in FIG. 1 is a progressive wave type ultrasonic motor. However, the present invention may be employed in a stationary wave type ultrasonic motor. FIG. 6 is a partial cross-sectional view illustrating a stationary wave type ultrasonic motor. A stator 31 includes a first and second piezoelectric elements 35, 36, first and second electrode plates 37, 38 and first and second metal blocks 33, 34. The blocks 33, 34 sandwich the piezoelectric elements 35, 36 and the electrode plates 37, 38. The piezoelectric elements 35, 36 and the electrode plates 37, 38 each have an aligned hole. A cylindrical insulation collar 40 is fitted in the aligned holes of the elements 35, 36 and the plates 37, 38. A rivet 41 (or a bolt) fastens the elements 35, 36, the plates 37, 38 and the blocks 33, 34 together. A rotor 32 is pressed against the stator 31. An insulation plate 42 is located between the first metal block 33 and the first electrode plate 37, and an insulation plate 43 is located between the second metal block 34 and the second piezoelectric element 36. The piezoelectric elements 35, 36 are electrically insulated from the rivet 41 and the blocks 33, 34. The elements 35, 36 are not grounded through the metal blocks 33, 34.The housing 2, the rotary shaft 6 and the screws 13 of the embodiment illustrated in FIGS. 1–4 are made of metal. However, the housing 2, the shaft 6 and the screws 13 may be made of any high-strength insulative material such as, for example, plastic. Further, the surface of the housing 2, the shaft 6 and the screws 13 may be covered with insulative material.As illustrated in FIG. 7, the base 3 of a motor similar to that shown in FIG. 1 may be made of insulative material such as synthetic resin. That is, the motor 1 may be insulated from the body frame by the base 3. The insulation plate 8 and the insulation washer 14 may be omitted in this construction. Thus, the ultrasonic motor of FIG. 7, which has fewer parts, has the same advantages as the motor of FIGS. 1–4.The lining member 15 may be made of insulative material. In the illustrated embodiments, the present invention is embodied in rotary type ultrasonic motors having a rotary shaft rotated by a rotor. However, the present invention may be embodied in a linear type ultrasonic motor, which linearly moves a movable body. In the illustrated embodiments, the present invention is embodied in a motor used in a telescopically adjustable steering column. However, the present invention may be embodied in an ultrasonic motor used in a device for tilting a steering column. Further, the present invention may be embodied in ultrasonic motors used in machines other than vehicles. Therefore, the present examples and embodiments are to be considered as illustrative and not restrictive and the invention is not to be limited to the details given herein, but may be modified within the scope and equivalence of the appended claims.

What is claimed is: 1. An ultrasonic motor comprising:
a housing;
a stator having a piezoelectric element, wherein the stator is accommodated in and secured to the housing;
a rotor accommodated in the housing, wherein the rotor contacts the stator, and wherein the piezoelectric element vibrates the stator to rotate the rotor; and
a rotary shaft supported by the housing, wherein the rotary shaft is coupled to the rotor to integrally rotate with the rotor;
wherein the housing includes a supporting member to which the stator is secured, and wherein an insulation member is located between the stator and the supporting member, said ultrasonic motor further including a first engaging structure located between the insulation member and the stator to engage the insulation member and the stator with each other, and a second engaging structure located between the insulation member and the supporting member to engage the insulation member and the supporting member with each other;
wherein the first engaging structure prevents the insulation member and the stator from moving relative to each other in a plane perpendicular to the axis of the motor and wherein the second engaging structure prevents the insulation member and the supporting member from moving relative to each other in a plane perpendicular to the axis of the motor; and
wherein the first engaging structure includes a first projection formed on a first side of the insulation member and an opening formed in the stator to receive the first projection and said second engaging structure including a second projection formed on a second side of the insulation member and an opening formed in the supporting member to receive the second projection. 2. The ultrasonic motor according to claim 1, wherein the first projection and the second projection are axially aligned with each other. 3. The ultrasonic motor according to claim 1, wherein the first projection is one of a plurality of first projections, wherein the first projections are spaced at equal angular intervals. 4. The ultrasonic motor according to claim 1, wherein the second projection is one of a plurality of second projections, wherein the second projections are spaced at equal angular intervals. 5. An ultrasonic motor comprising:
a metal housing secured to a vehicle body frame, said housing including a supporting member;
a stator having a piezoelectric element, wherein the stator is accommodated in and secured to the housing, said stator being secured to said supporting member;
a rotor accommodated in the housing, wherein the rotor contacts the stator, and wherein the piezoelectric element vibrates the stator to rotate the rotor;
a rotary shaft supported by the housing, wherein the rotary shaft is coupled to the rotor to integrally rotate with the rotor,
an insulation member located between the supporting member and the stator for electrically insulating the stator from the housing;
a first engaging structure located between the insulation member and the stator to engage the insulation member and the stator with each other, wherein the first engaging structure includes a first projection formed on a first side of the insulation member and a first opening formed in the stator to receive the first projection; and
a second engaging structure located between the insulation member and the housing to engage the insulation member and the housing with each other, wherein the second engaging structure includes a second projection formed on a second side of the insulation member and a second opening formed in the housing to receive the second projection;
wherein the first engaging structure prevents the insulation member and the stator from moving relative to each other in a plane perpendicular to the axis of the motor and wherein the second engaging structure prevents the insulation member and the supporting member from moving relative to each other in a plane perpendicular to the axis of the motor. 6. The ultrasonic motor according to claim 5, wherein the insulation member is formed with high-strength rigid resin. 7. The ultrasonic motor according to claim 5, wherein the second opening is formed in the supporting member. 8. The ultrasonic motor according to claim 5, wherein the first projection and the second projection are axially aligned with each other. 9. The ultrasonic motor according to claim 5, wherein the first projection is one of a plurality of first projections, wherein the first projections are spaced at equal angular intervals. 10. The ultrasonic motor according to claim 5, wherein the second projection is one of a plurality of second projections, wherein the second projections are spaced at equal angular intervals. 11. An ultrasonic motor comprising:
a stator having a piezoelectric element, wherein the stator is accommodated in and secured to a housing;
a rotor accommodated in the housing, wherein the rotor contacts the stator, and wherein the piezoelectric element vibrates the stator to rotate the rotor;
a rotary shaft supported by the housing, wherein the rotary shaft is coupled to the rotor to integrally rotate with the rotor;
a supporting member, which is part of the housing, to which the stator is secured, wherein an insulation member is located between the stator and the supporting member, and
first engaging structure located between the insulation member and the stator to engage the insulation member and the stator with each other and second engaging structure located between the insulation member and the supporting member to engage the insulation member and the supporting member with each other;
wherein the first engaging structure prevents the insulation member and the stator from moving relative to each other in a plane perpendicular to the axis of the motor, and wherein the second engaging structure prevents the insulation member and the supporting member from moving relative to each other in a plane perpendicular to the axis of the motor; and wherein the first engaging structure includes a first projection formed on a first side of the insulation member and an opening formed in the stator to receive the first projection, and said second engaging structure including a second projection formed on a second side of the insulation member and an opening formed in the supporting member to receive the second projection.

12. The ultrasonic motor according to claim 11, wherein the first projection and the second projection are axially aligned with each other.

13. The ultrasonic motor according to claim 11 wherein the first projection is one of a plurality of first projections, wherein the first projections are spaced at equal angular intervals.

14. The ultrasonic motor according to claim 11, wherein the second projection is one of a plurality of second projections, wherein the second projections are spaced at equal angular intervals.

* * * * *